(12) United States Patent
Zhang et al.

(10) Patent No.: US 9,111,041 B1
(45) Date of Patent: Aug. 18, 2015

(54) METHODS, SYSTEMS AND COMPUTER PROGRAM PRODUCTS FOR USER INTERACTION IN TEST AUTOMATION

(71) Applicant: CA, Inc., Islandia, NY (US)

(72) Inventors: Bolt Zhang, Beijing (CN); Justin Tian, Beijing (CN); Shichao Wang, Beijing (CN); Kevin Liu, Beijing (CN)

(73) Assignee: CA, Inc., New York, NY (US)

( * ) Notice: Subject to any disclaimer, the term of this patent is extended or adjusted under 35 U.S.C. 154(b) by 103 days.

(21) Appl. No.: 13/891,431

(22) Filed: May 10, 2013

(51) Int. Cl.
G06F 9/44 (2006.01)
G06F 9/45 (2006.01)
G06F 11/36 (2006.01)

(52) U.S. Cl.
CPC ........ *G06F 11/3688* (2013.01); *G06F 11/3672* (2013.01); *G06F 11/3664* (2013.01)

(58) Field of Classification Search
CPC ............ G06F 11/3668; G06F 11/3688; G06F 11/3672
See application file for complete search history.

(56) References Cited

U.S. PATENT DOCUMENTS

| | | | | |
|---|---|---|---|---|
| 7,979,845 B2* | 7/2011 | Marimuthu | ................... | 717/124 |
| 8,893,089 B2* | 11/2014 | Rao et al. | ...................... | 717/127 |
| 2004/0103396 A1* | 5/2004 | Nehab | ........................... | 717/127 |
| 2006/0179422 A1* | 8/2006 | Gortler | ......................... | 717/124 |
| 2007/0074167 A1* | 3/2007 | Cohrs et al. | ................... | 717/124 |
| 2007/0266382 A1* | 11/2007 | Webb | ............................ | 717/162 |
| 2008/0127095 A1* | 5/2008 | Brennan et al. | ............... | 717/124 |
| 2008/0271006 A1* | 10/2008 | Nagappan et al. | ........... | 717/162 |
| 2009/0138855 A1* | 5/2009 | Huene et al. | ................... | 717/125 |
| 2009/0199163 A1* | 8/2009 | Soroker et al. | ................ | 717/128 |
| 2009/0249216 A1* | 10/2009 | Charka et al. | ................. | 715/744 |
| 2011/0296383 A1* | 12/2011 | Pasternak | ...................... | 717/124 |
| 2012/0131387 A1 | 5/2012 | Salloum et al. | | |
| 2012/0246619 A1* | 9/2012 | Thirumalai et al. | .......... | 717/124 |
| 2012/0324432 A1* | 12/2012 | Mizrachi et al. | .............. | 717/162 |
| 2013/0024847 A1* | 1/2013 | Browne et al. | ................ | 717/131 |
| 2013/0124919 A1* | 5/2013 | Subramaniam | .................. | 714/28 |
| 2013/0179865 A1* | 7/2013 | Neumeyer et al. | ............ | 717/127 |
| 2014/0040867 A1* | 2/2014 | Wefers et al. | ................. | 717/131 |
| 2014/0123110 A1* | 5/2014 | WAN et al. | .................... | 717/124 |
| 2014/0372989 A1* | 12/2014 | Shani et al. | ................... | 717/131 |

OTHER PUBLICATIONS

Sasikumar Punnekkat, User Interface Test Automation and its Challenges in an Industrial Scenario, 2011, pp. 12-26.*
Mark Blackburn, Model-based Approach to Security Test Automation, 2001, pp. 1-14.*
Xuebing Yang, Graphic User Interface Modelling and Testing Automation, 2011, pp. 27-32 and 49-85.*

* cited by examiner

*Primary Examiner* — Thuy Dao
*Assistant Examiner* — Mongbao Nguyen
(74) *Attorney, Agent, or Firm* — Myers Bigel Sibley & Sajovec, P.A.

(57) ABSTRACT

An automated portion of a software test workflow is executed. Execution of the automated portion is halted responsive to a manual portion of the software test workflow that tests a target software code. A notification is sent to the user based on the manual portion of the software test workflow. The notification requests at least one input from the user. The input is received. Responsive to receipt of the input, execution of the automated portion of the software test workflow is resumed.

15 Claims, 6 Drawing Sheets

METHODS, SYSTEMS AND COMPUTER PROGRAM PRODUCTS FOR USER INTERACTION IN TEST AUTOMATION

TECHNICAL FIELD

The present disclosure relates generally to developing and testing software applications.

BACKGROUND

Automation plays an increasingly important role in software testing, including in agile software development, which involves adaptive and iterative methods for collaborating and developing software. Many test cases may be automated. However, some components of a test case are difficult to automate or do not achieve the desired test results when automated.

BRIEF SUMMARY

According to some embodiments, a method includes executing an automated portion of a software test workflow that tests a target software code. Execution of the automated portion is halted responsive to reaching a manual portion of the software test workflow. A notification is sent to the user based on the manual portion. The notification requests at least one input from the user. The input is received. Responsive to receipt of the input, execution of the automated portion of the software test workflow is resumed.

In some embodiments, a test script is executed based on the software test workflow. Halting may comprise detecting a component of the software test workflow representing the manual portion.

In some embodiments, an electronic notification is sent to the user over a network. A link may also be sent to the user that connects the user to the manual portion or a display of the manual portion. In other embodiments, a task list is sent to the user. The task list may comprise a list of user test tasks based on the manual portion.

In some embodiments, a modification of software code is received. A selection and/or text input may also be received.

Some other embodiments are directed to related methods, systems and computer program products.

It is noted that aspects described with respect to one embodiment may be incorporated in different embodiments although not specifically described relative thereto. That is, all embodiments and/or features of any embodiments can be combined in any way and/or combination. Moreover, other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Embodiments of the present disclosure are illustrated by way of example and are not limited by the accompanying figures with like references indicating like elements.

DETAILED DESCRIPTION

Figure 1:
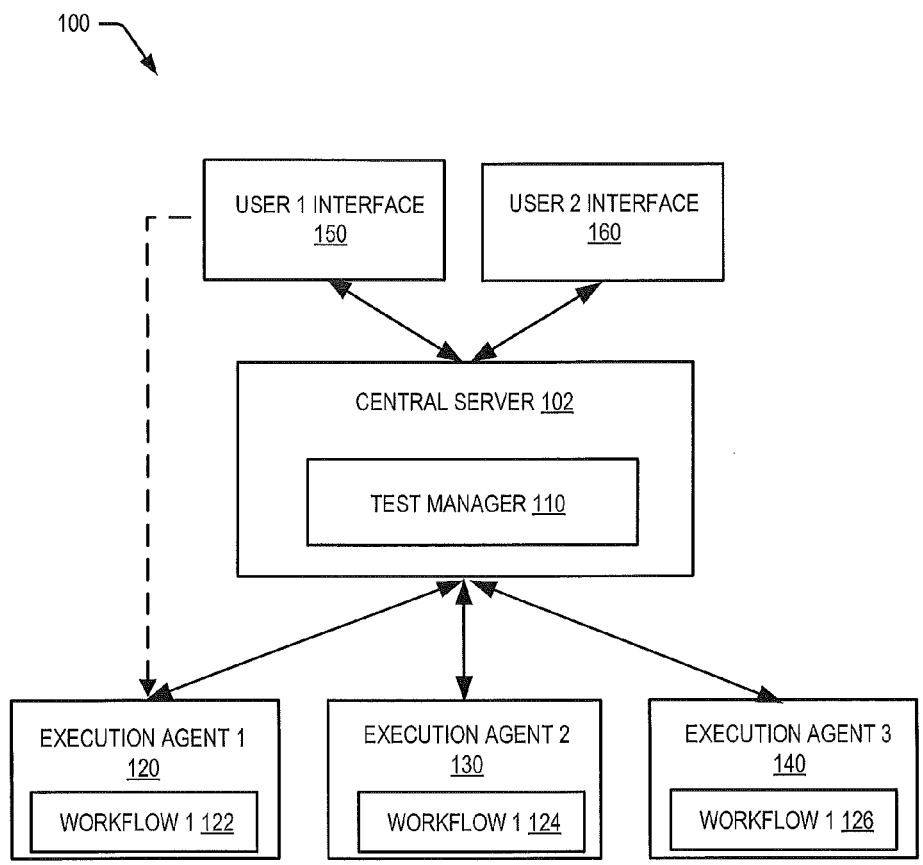
FIG. 1 is a block diagram of a system for testing software, according to various embodiments described herein.
Figure 2:
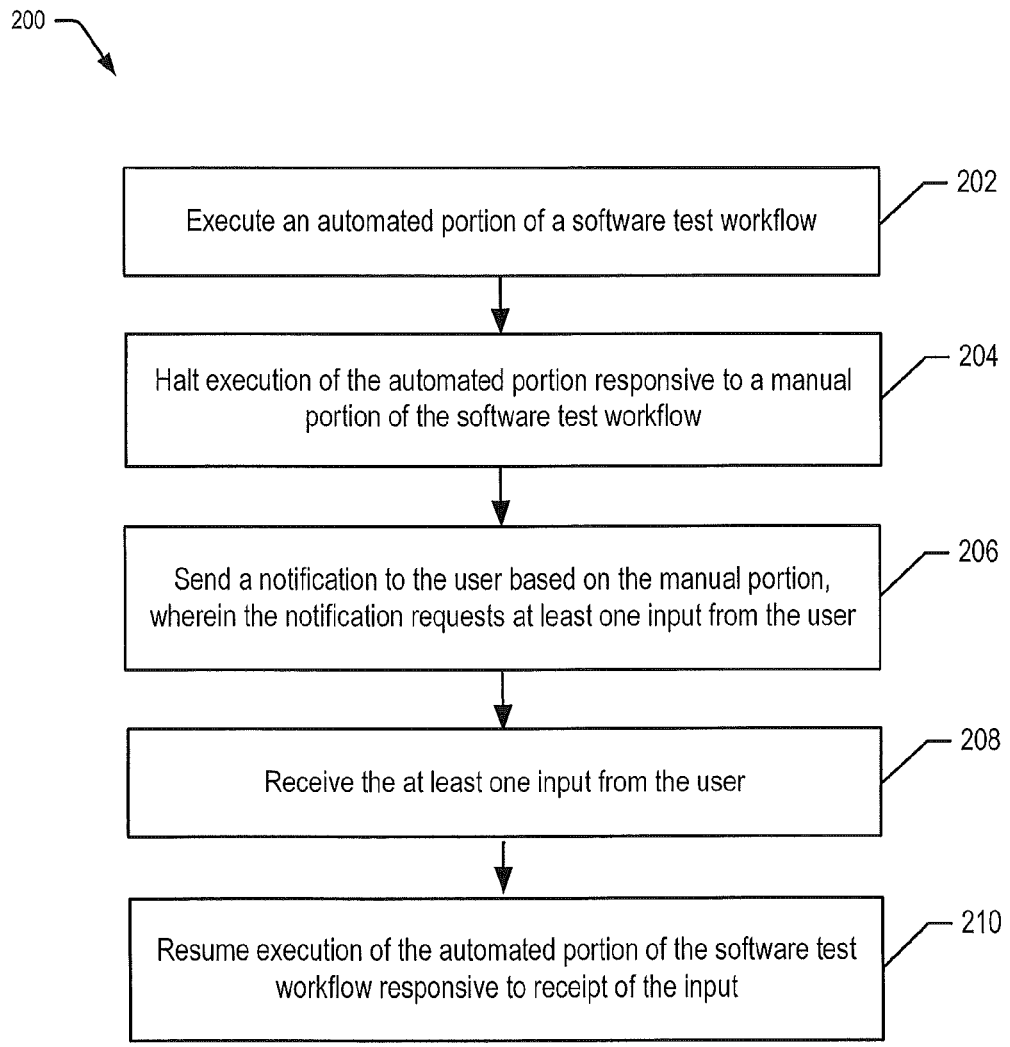
FIG. 2 is a flow chart illustrating a process for testing software, according to various embodiments described herein.

Embodiments of the present disclosure will be described more fully hereinafter with reference to the accompanying drawings. Other embodiments may take many different forms and should not be construed as limited to the embodiments set forth herein. Like numbers refer to like elements throughout.

The terminology used herein is for the purpose of describing particular embodiments only and is not intended to be limiting to other embodiments. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented as entirely hardware, entirely software (including firmware, resident software, micro-code, etc.) or combined software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Manual software tests may consume a lot of time and resources. Many test cases may be fully automated to assist software developers and software testers. However, not all components of a test case produce the best results when automated, even though automating the rest of the test case is effective. Some automated tests may undergo some type of manual review after the automation has completed. However, these approaches have their deficiencies.

In various embodiments described herein, automated test workflows may be executed. However, some portions of an automated test may be more effective if performed manually, such as determining whether a color combination on a web page is appealing. The test workflow may be halted and a user may be notified to provide input or complete a test component manually. Upon completion of the manual test component or entry of requested input, the automated test workflow resumes.

FIG. 1 is a block diagram illustrating a system 100 for testing software, according to some embodiments. Test manager 110 may manage and monitor software testing using software test workflows, such as workflows 122-126, and execution agents, such as execution agents 120, 130 and 140. Execution agents 120-140 may execute test workflows 122-126. Execution agents may exist on central server 102 or on one or more separate servers or clients, which may exist on any combination of one or more computing devices.

The computing devices may be connected together directly or indirectly over a network. The network facilitates wireless or wired communication between computing devices, and may communicate using, for example, IP packets, Frame Relay frames, Asynchronous Transfer Mode (ATM) cells, voice, video, data, and other suitable information between network addresses. The network may include one or more local area networks (LANs), radio access networks (RANs), metropolitan area networks (MANS), wide area networks (WANs), virtual private networks (VPNs), a portion of the global computer network known as the Internet, and/or any other communication system or systems at one or more locations.

A test workflow may comprise one or more automated portions and one or more manual portions. Automated portions may be executed by an execution agent without user input or control. Automated portions may be programmed using test workflows 122-126 or test scripts based on workflows 122-126. Automated portions may check for desired functionality, proper handling of input and output, availability of data, accuracy of algorithms and/or other functions that may be evaluated by computer programs that may be developed by those skilled in the art.

Manual portions may require action by a human user. Such user actions may include observations perceptible to a user but not so perceptible for a computer or machine to evaluate. For example, visual aesthetics in a visual display may be easier for a human to evaluate. A computer may possibly evaluate the visual appeal of an application, such as a web page, but the resources to program a computer program to make such an evaluation may not be available or cost effective. However, such an evaluation may be performed by a human in seconds. Other manual portions may be too complex for existing machines. Such tasks may include, but are not limited to, analysis and/or modification of software code.

In further embodiments, test manager 110 may be used to define and/or modify test workflows, human tasks, and/or associated test scripts. Test manager 110 may provide a user interface, such as user interfaces 150 and 160, for workflow and script development and for other test administration purposes. Manual portions of a workflow may use user interfaces 150 and 160 to notify users, send information and receive information related to manual portions of a test workflow. In further embodiments, central server 102 may collect and share testing results.

User interfaces 150-160 may include software for interacting with test manager 110, execution agents 120-140 and/or test workflows 122-126. User interfaces 150-160, execution agents 120-140 and central server 102 may communicate using web service APIs. Such interaction may also take place through a browser on a node or computing device. The browser may be any commonly used browser, including any multithreading browser. Other network related software may be used. User interfaces 150-160 may connect to execution agents 120-140 directly.

Figure 3:
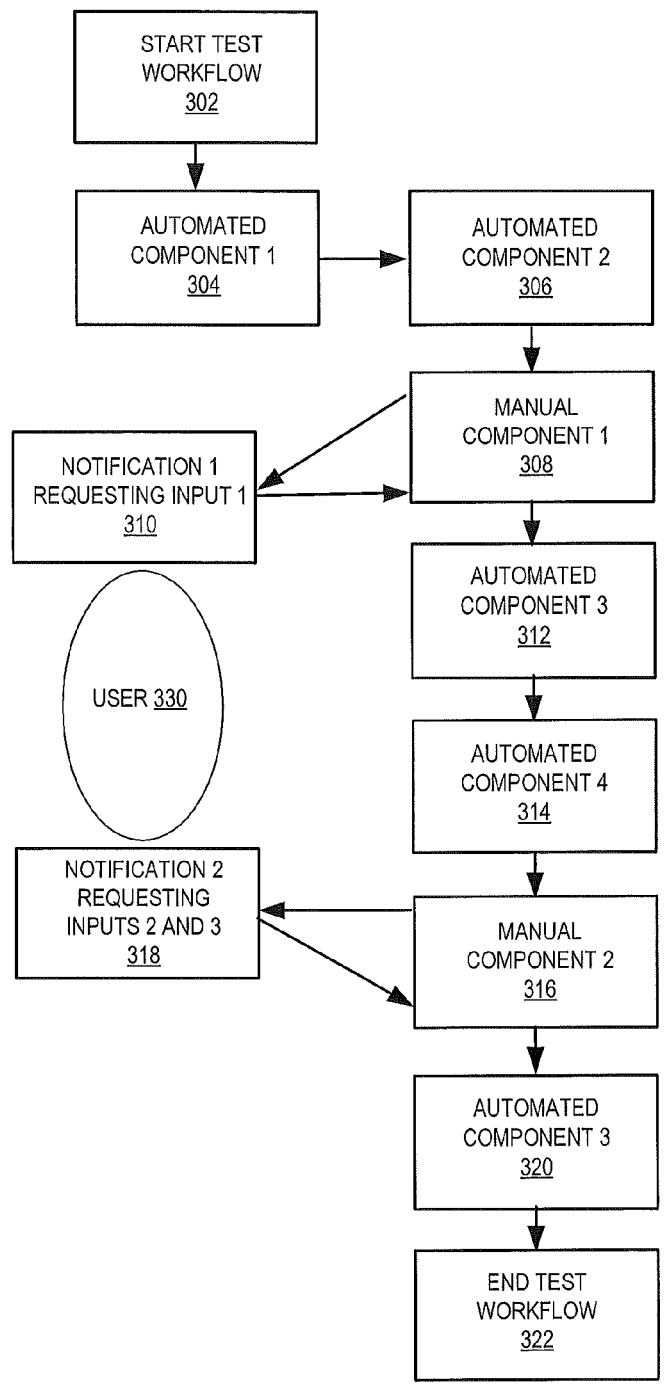
FIG. 3 is a flow chart illustrating a workflow for testing software, according to various embodiments described herein.

Flowchart 200 illustrates operations corresponding to a process for testing software, according to some embodiments. In block 202, an automated portion of a software test workflow is executed. This workflow may be test workflow 122, which is shown in FIG. 3, according to some embodiments. Test workflow 122 may test a target software code. The target software code may be computer code or script that is to be executed separately from the code executing software test workflow 122.

As shown in FIG. 3, workflow 122 has a start 302 and an automated portion to be executed automatically by execution agent 120. The automated portion includes automated components 304, 306, 312, 314 and 320. For example, automated component 304 may include a login into a web page that is being tested while automated component 306 may include a sub-flow that tests a search function of the web page. Sub-flows may involve automated components performing a more broadly defined test. Third party APIs and/or Services may also be automatically executed.

Workflow 122 also includes two manual portions, including manual component 308. Manual component 308 may include one or more tasks for a user, such as checking the web page style. When manual component 308 is reached or detected in workflow 122 by execution agent 120, execution of workflow 122 is halted, as shown by block 204.

Figure 4:
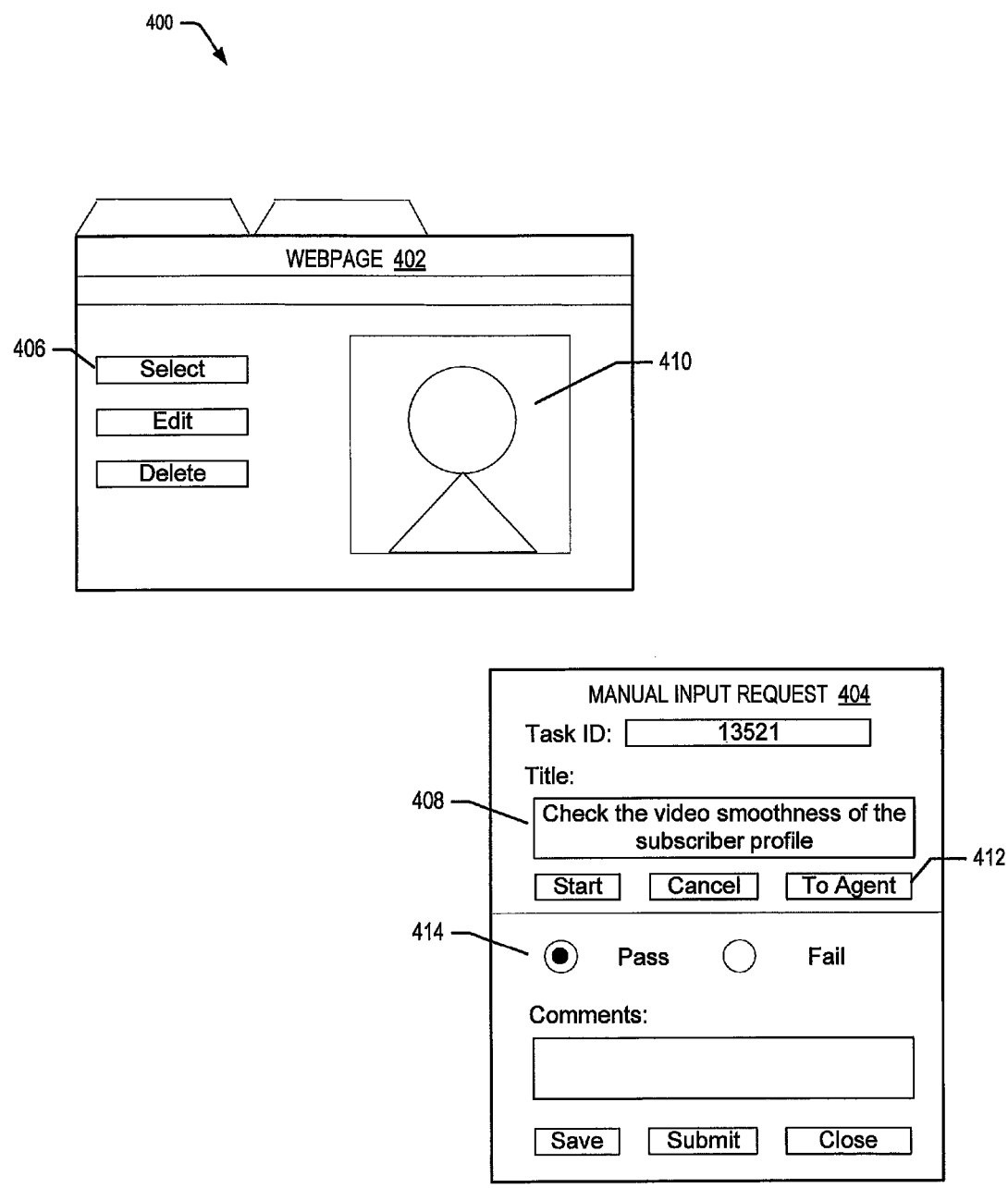
FIG. 4 is a display view of testing software, according to various embodiments described herein.

Manual component 308 requires user input from a user, such as user 330. At block 206, a notification 310 is sent to the user based on manual component 308. Notification 310 requests input from user 330. FIG. 4 shows a display view 400 of testing software, according to some embodiments. An example software application, webpage 402, is being tested by workflow 122. The automated portion of workflow 122 may test the functionality of different portions of web page 402, such as select button 406. However, workflow 122 requires input regarding the appearance of the video profile of a subscriber, shown in video window 410. It may be difficult for a computer program to evaluate the appearance and smoothness of a video of the video profile. User 330 is to evaluate the video profile and provide input at this stage of workflow 122.

A notification may be provided to alert the user to view webpage 402. This may be a displayed and/or audible alert, email, text, short message service (SMS) messages, phone message or any other communication to user 330, who may be able to view the webpage 402 through a display on a computing device. Other available notification channels may be used for notification. The computing device may be the same device that hosts execution agent 120, or it may be another computing device, such a remote computing device on the network or a mobile device.

Notification 310 may include and/or provide for a display of an input window, such as manual input request 404. Manual input request 404 may ask for the input in a message 408. The video may be included in the window of request 404. Request window 404 may also include a link to webpage 402, a test environment display for webpage 402 or video window 410. Such a link may be provided by "To Agent" button 412. In further embodiments, if user 330 selects button 412, user 330 is able to connect, or remotely connect, to execution agent 120 and view webpage 402 and video window 410. This may involve logging into or connecting to a remote desktop or similar environment. A connection may be a connection to another application on the same computer. A remote connection may be a connection (e.g., network session) to another computing device over a network. There may or may not be an initial login and/or security application to get to webpage 402 or to a testing environment display for webpage 402.

User 330 may evaluate the video smoothness of a subscriber video profile and enter an input 414. In this example, input 414 may be a pass or fail indication, or may adjust a parameter that controls execution performance (e.g., execution priority, video frame rate, video resolution, video size, etc.). Input 414 may be any other indication or selection. Text input may also be provided. In some cases, user 330 may be directed to a portion of software code to view, correct and/or modify. Input 414 is received at block 208.

At block 210, execution of the automated portion is resumed. This may be responsive to a determination that the input was received and/or that the manual portion was attempted and/or completed by user 330. There may be some conditions that determine when an automated portion will resume execution, based on various levels of participation by and/or a timing of user 330. Workflow 122 may be resumed to continue with automated component 312. Another manual component 316 may send another notification 318 requesting further input. Workflow 122 may include branches, conditions, merges and other workflow paths, which are not shown in FIG. 3. When workflow 122 reaches end 322, the test administrator is notified. This notification may be similar to other user notifications.

Figure 5:
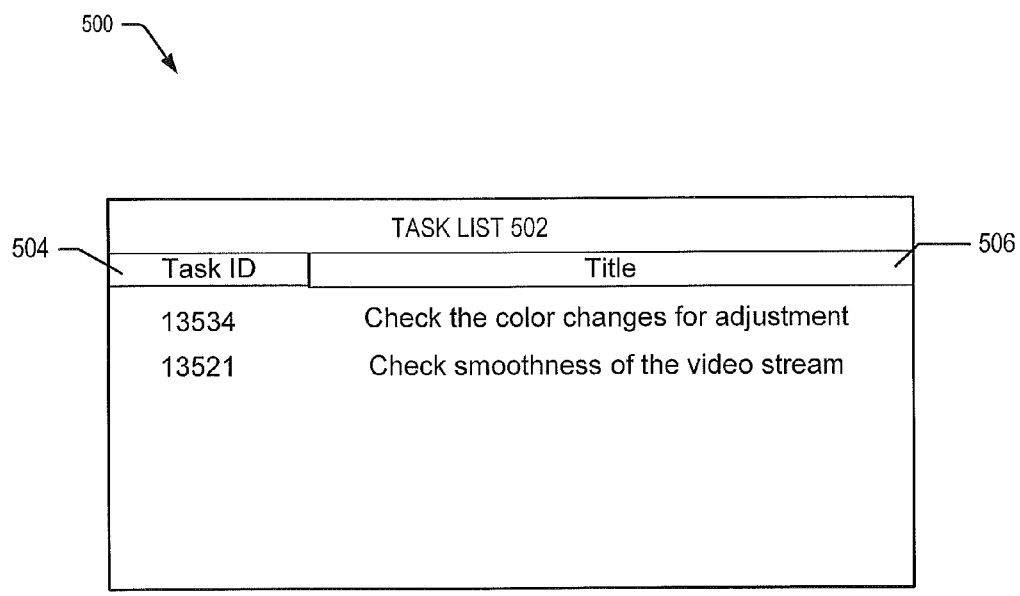
FIG. 5 is a display view of testing software, according to various embodiments described herein.

According to some embodiments, a user may be asked for multiple inputs. Multiple inputs or tasks may be relayed or requested in a task list. For example, notification 318 may include task list 502, shown in the embodiment of display view 500 of FIG. 5. Task list 502 may include multiple actions or test tasks for one or more users. Tasks may be identified with unique task ids 504 and described with titles 506. A user may be sent or notified of task list 502, as described above.

Various embodiments of the disclosure may provide for more efficiency is testing software code and/or any other products that may be evaluated. This efficiency is possible through the ability of workflows, according to some embodiments, to switch from automated portions to manual portions and back to automated portions in seamless operation. The described embodiments may also provide for better user interaction with a test environment.

As will be appreciated by one skilled in the art, aspects of the disclosure may be embodied as a method, data processing system, and/or computer program product. Furthermore, embodiments may take the form of a computer program product on a tangible computer readable storage medium having computer program code embodied in the medium that can be executed by a computing device.

Figure 6:
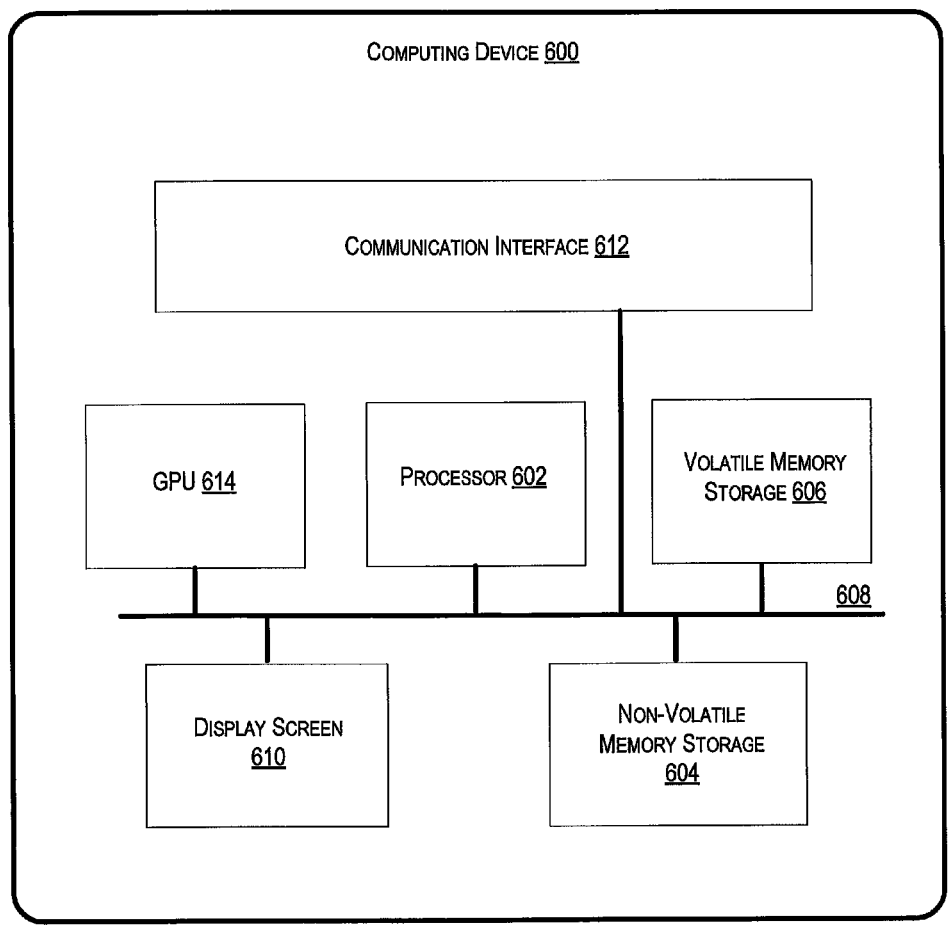
FIG. 6 is a block diagram of a computing device in which embodiments can be implemented.

FIG. 6 is an example computer device 600 in which embodiments of the present disclosure, or portions thereof, may be implemented as computer-readable code. For example, the components of test manager 110, execution agents 120-140, user interfaces 150-160 and/or any other components of system 100, flowcharts 200-300 and/or display views 400-500 may be implemented in one or more computer devices 600 using hardware, software implemented with hardware, firmware, tangible computer-readable storage media having instructions stored thereon, or a combination thereof and may be implemented in one or more computer systems or other processing systems. Computer devices 600 may also be virtualized instances of computers. Components and methods in FIGS. 1-5 may be embodied in any combination of hardware and software.

Computing device 600 may include one or more processors 602, one or more non-volatile storage mediums 604, one or more memory devices 606, a communication infrastructure 608, a display screen 610 and a communication interface 612. Computing device 600 may also have networking or communication controllers, input devices (keyboard, a mouse, touch screen, etc.) and output devices (printer or display).

Processor(s) 602 are configured to execute computer program code from memory devices 604 or 606 to perform at least some of the operations and methods described herein, and may be any conventional or special purpose processor, including, but not limited to, digital signal processor (DSP), field programmable gate array (FPGA), application specific integrated circuit (ASIC), and multi-core processors.

GPU 614 is a specialized processor that executes instructions and programs, selected for complex graphics and mathematical operations, in parallel.

Non-volatile memory storage 604 may include one or more of a hard disk drive, flash memory, and like devices that may store computer program instructions and data on computer-readable media. One or more of non-volatile storage memory 604 may be a removable storage device.

Volatile memory storage 606 may include one or more volatile memory devices such as but not limited to, random access memory. Communication infrastructure 608 may include one or more device interconnection buses such as Ethernet, Peripheral Component Interconnect (PCI), and the like.

Typically, computer instructions are executed using one or more processors 602 and can be stored in non-volatile memory storage 604 or volatile memory storage 606.

Display screen 610 allows results of the computer operations to be displayed to a user or an application developer.

Communication interface 612 allows software and data to be transferred between computer system 600 and external devices. Communication interface 612 may include a modem, a network interface (such as an Ethernet card), a communications port, a PCMCIA slot and card, or the like. Software and data transferred via communication interface 612 may be in the form of signals, which may be electronic, electromagnetic, optical, or other signals capable of being received by communication interface 612. These signals may be provided to communication interface 612 via a communications path. The communications path carries signals and may be implemented using wire or cable, fiber optics, a phone line, a cellular phone link, an RF link or other communications channels. According to an embodiment, a host operating system functionally interconnects any computing device or hardware platform with users and is responsible for the management and coordination of activities and the sharing of the computer resources.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, JavaScript, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computer environment or offered as a service such as a Software as a Service (SaaS).

Aspects of the present disclosure are described herein with reference to flowchart illustrations and/or block diagrams of methods, systems and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall support claims to any such combination or subcombination.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein.

The breadth and scope of the present invention should not be limited by any of the above-described embodiments or any actual software code with the specialized control of hardware to implement such embodiments, but should be defined only in accordance with the following claims and their equivalents.

What is claimed is:

1. A computer-implemented method, comprising:
    determining, using a first computing device, that a software test workflow comprises an automated portion and a manual portion,
        wherein the software test workflow tests a target software code,
        wherein the manual portion of the software test workflow comprises a manual test task which requires action by a human user, and
        wherein the automated portion of the software test workflow comprises automated test tasks which are executed without user input or control;
    executing, using the first computing device, the automated portion of the software test workflow;
    halting execution of the automated portion of the software test workflow in response to a determination that execution of the software test workflow reached the manual portion of the software test workflow;
    sending a notification to a user based on the manual portion of the software test workflow, wherein the notification requests at least one input from the user, wherein the at least one input corresponds to the manual test task performed by the user,
        wherein the sending comprises sending an electronic notification to a second computing device, remote from the first computing device, of the user over a network,
        wherein sending the electronic notification comprises sending a link to the user, wherein user selection of the link creates a connection between the manual portion of the software test workflow at the first computing device and the second computing device, and wherein the connection between the manual portion of the software test flow at the first computing device and the second computing device comprises a remote connection to an execution agent executing the software test workflow at the first computing device;

receiving, at the first computing device, the at least one input from the user from the second computing device over the connection between the manual portion of the software test flow at the first computing device and the second computing device; and resuming execution of the automated portion of the software test workflow responsive to receipt of the at least one input.

2. The method of claim 1, wherein the executing comprises executing a test script based on the software test workflow.

3. The method of claim 1, wherein the halting comprises detecting a component of the software test workflow representing the manual portion of the software test workflow.

4. The method of claim 1, wherein the receiving comprises receiving a modification of the target software code.

5. The method of claim 1, wherein the sending comprises sending the user a task list, wherein the task list comprises a list of user test tasks based on the manual portion of the software test workflow.

6. The method of claim 1, wherein the receiving comprises receiving a selection from among a plurality of input options defined by the manual portion of the software test workflow.

7. The method of claim 1, wherein the receiving comprises receiving a text input.

8. The method of claim 1 wherein the notification requests at least one input from the user regarding an evaluation of a visual aesthetic of a visual display of the software code, wherein receiving comprises receiving the at least one input from the user regarding the evaluation of the visual aesthetic of the visual display of the software code, and wherein resuming execution comprises resuming execution of the automated portion of the software test workflow using the at least one input from the user regarding the evaluation of the visual aesthetic of the visual display of the software code.

9. A system, comprising:
a processor; and
a memory coupled to the processor and comprising computer readable program code embodied in the memory that when executed by the processor causes the processor to perform operations comprising:
determining that a software test workflow comprises an automated portion and a manual portion,
wherein the software test workflow tests a target software code,
wherein the manual portion of the software test workflow comprises a manual test task which requires action by a human user, and
wherein the automated portion of the software test workflow comprises automated test tasks which are executed without user input or control;
executing the automated portion of the software test workflow;
halting execution of the automated portion of the software test workflow in response to a determination that execution of the software test workflow reached the manual portion of the software test workflow;
sending a notification to a user based on the manual portion of the software test workflow, wherein the notification requests at least one input from the user, wherein the at least one input corresponds to the manual test task performed by the user,
wherein the sending comprises sending an electronic notification to a computing device, remote from the system, of the user over a network,
wherein sending the electronic notification comprises sending a link to the user,
wherein user selection of the link creates a connection between the manual portion of the software test workflow at the system and the computing device of the user, and
wherein the connection between the manual portion of the software test flow at the system and the computing device of the user comprises a remote connection to an execution agent executing the software test workflow at the system;
receiving, at the system, the at least one input from the computing device of the user over the connection between the manual portion of the software test flow at the system and the computing device of the user; and
resuming execution of the automated portion of the software test workflow responsive to receipt of the at least one input.

10. The system of claim 9, the operations further comprising:
detecting a component of the software test workflow representing the manual portion of the software test workflow.

11. The system of claim 9 wherein the notification requests at least one input from the user regarding an evaluation of a visual aesthetic of a visual display of the software code, wherein receiving comprises receiving the at least one input from the user regarding the evaluation of the visual aesthetic of the visual display of the software code, and wherein resuming execution comprises resuming execution of the automated portion of the software test workflow using the at least one input from the user regarding the evaluation of the visual aesthetic of the visual display of the software code.

12. A computer program product, comprising:
a non-transitory tangible computer readable storage medium having computer readable program code embodied in the medium that when executed by a processor causes the processor to perform operations comprising:
determining that a software test workflow comprises an automated portion and a manual portion,
wherein the software test workflow tests a target software code,
wherein the manual portion of the software test workflow comprises a manual test task which requires action by a human user, and
wherein the automated portion of the software test workflow comprises automated test tasks which are executed without user input or control;
executing the automated portion of the software test workflow;
halting execution of the automated portion of the software test workflow in response to a determination that execution of the software test workflow reached the manual portion of the software test workflow;
sending a notification to a user based on the manual portion of the software test workflow, wherein the notification requests at least one input from the user, wherein the at least one input corresponds to the manual test task performed by the user, wherein the sending comprises sending an electronic notification to a computing device, remote from the processor, of the user over a network, wherein sending the electronic notification comprises sending a link to the user, wherein user selection of the link creates a connection between the manual portion of the software test workflow at the processor and the computing device of the user, and wherein the connection between the manual portion of the software test flow at the processor and the computing device of the user comprises a remote connection to an execution agent executing the software test workflow;

receiving, at the processor, the at least one input from the computing device of the user over the connection between the manual portion of the software test flow at the processor and the computing device of the user; and resuming execution of the automated portion of the software test workflow responsive to receipt of the at least one input.

13. The computer program product of claim 12, further comprising computer readable program code causing the processor to perform:

detecting a component of the software test workflow representing the manual portion of the software test workflow.

14. The computer program product of claim 12, further comprising computer readable program code causing the processor to perform:

receiving a modification of the target software code.

15. The computer program product of claim 12 wherein the notification requests at least one input from the user regarding an evaluation of a visual aesthetic of a visual display of the software code, wherein receiving comprises receiving the at least one input from the user regarding the evaluation of the visual aesthetic of the visual display of the software code, and wherein resuming execution comprises resuming execution of the automated portion of the software test workflow using the at least one input from the user regarding the evaluation of the visual aesthetic of the visual display of the software code.

* * * * *